United States Patent
Yokoo (10) Patent No.: US 9,952,489 B2
(45) Date of Patent: Apr. 24, 2018

(54) DISCHARGE LAMP, LIGHT SOURCE DEVICE, AND PROJECTOR

(71) Applicant: SEIKO EPSON CORPORATION, Tokyo (JP)

(72) Inventor: Tomohiro Yokoo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/225,208

(22) Filed: Aug. 1, 2016

(65) Prior Publication Data

US 2017/0052437 A1  Feb. 23, 2017

(30) Foreign Application Priority Data

Aug. 21, 2015  (JP) ................ 2015-163475

(51) Int. Cl.

| G03B 21/20 | (2006.01) |
|---|---|
| H01J 61/073 | (2006.01) |
| H01J 61/26 | (2006.01) |
| H01J 61/33 | (2006.01) |
| H01J 61/86 | (2006.01) |

(52) U.S. Cl.
CPC ..... G03B 21/2026 (2013.01); G03B 21/2053 (2013.01); H01J 61/0732 (2013.01); H01J 61/26 (2013.01); H01J 61/33 (2013.01); H01J 61/86 (2013.01)

(58) Field of Classification Search
CPC ........ H01J 61/82; H01J 61/30; H01J 61/0732; H01J 61/26; H01J 61/33; H01J 61/86; G03B 21/2026; G03B 21/2053

USPC ................... 353/85; 315/246, 248
See application file for complete search history.

(56) References Cited

U.S. PATENT DOCUMENTS

| 5,998,940 A * | 12/1999 | Takahashi ............... H01J 61/82 313/493 |
|---|---|---|
| 6,307,321 B1 | 10/2001 | Honda et al. |
| 6,559,600 B1 | 5/2003 | Wada et al. |
| 7,098,597 B2 | 8/2006 | Inaoka et al. |
| 7,211,956 B2 | 5/2007 | Tukamoto et al. |
| 9,053,922 B2 | 6/2015 | Poortmans et al. |
| 2004/0189206 A1 | 9/2004 | Inaoka et al. |
| 2004/0245930 A1 | 12/2004 | Tukamoto et al. |
| 2008/0106701 A1 * | 5/2008 | Yamaoka ............... G03B 21/16 353/52 |

(Continued)

FOREIGN PATENT DOCUMENTS

| JP | 2000-048769 A | 2/2000 |
|---|---|---|
| JP | 2000-231902 A | 8/2000 |

(Continued)

*Primary Examiner* — Steven H Whitesell Gordon
*Assistant Examiner* — Jerry Brooks
(74) *Attorney, Agent, or Firm* — Oliff PLC (57) ABSTRACT

The disclosure relates to a discharge lamp including a light emitting tube having a discharge space therein, and a pair of electrodes disposed in the discharge space so as to be opposed to each other, wherein a changing rate of a cross-sectional area is equal to or lower than 200%. The changing rate is a rate of change of the cross-sectional area in every 0.25 mm in a direction along an optical axis of the light emitting tube. The cross-sectional area is an area of a plane perpendicular to the optical axis in a space between an outside shape of at least one of the pair of electrodes and an inside wall of the light emitting tube.

10 Claims, 6 Drawing Sheets

(56) References Cited

U.S. PATENT DOCUMENTS

2008/0224615 A1\* 9/2008 Higashi ................ H01J 61/827
                                                                  313/631
2013/0257269 A1    10/2013 Poortmans et al.

FOREIGN PATENT DOCUMENTS

| JP | 2000-231903 A | 8/2000 |
| JP | 2004-164996 A | 6/2004 |
| JP | 2004-303532 A | 10/2004 |
| JP | 2004-362861 A | 12/2004 |
| JP | 4297227 B2 | 7/2009 |
| JP | 2009-211916 A | 9/2009 |
| JP | 4400095 B2 | 1/2010 |
| JP | 2013-544015 A | 12/2013 |

\* cited by examiner

DISCHARGE LAMP, LIGHT SOURCE DEVICE, AND PROJECTOR

BACKGROUND

1. Technical Field

The present invention relates to a discharge lamp, a light source device, and a projector.

2. Related Art

In the past, there has been used a high-pressure discharge lamp as a discharge lamp for a projector (see, e.g., Japanese Patent No. 4,400,095).

Incidentally, in the discharge lamp described above, the metal constituting the electrode evaporates, and then circulates in the light emitting tube due to the convection flow caused by the arc discharge. When the convection flow collides with a base part of the electrode such as a coil part, the metal circulating in the light emitting tube due to the convection flow is deposited on the base part of the electrode. Therefore, the metal is sequentially deposited on the same place of the base part of the electrode, and thus, a projection of the metal is formed in the base part of the electrode in some cases.

If the projection of the metal is formed in the base part of the electrode, there is a possibility that the discharge occurs between a tip of the projection and the inside wall of the light emitting tube to deteriorate the inside wall of the light emitting tube. Thus, it becomes easy for the material circulating in the light emitting tube to be deposited on the deteriorated part of the inside wall of the light emitting tube, and there is a problem that blackening and devitrification occur.

SUMMARY

An advantage of some aspects of the invention is to provide a discharge lamp, a light source device, and a projector capable of preventing the metal projection from being formed in the base part of the electrode.

As a result of keen research, the inventors has acquired the knowledge that by decreasing the speed of the convection flow in the light emitting tube, it is possible to make the metal projection difficult to be formed. Then, based on the knowledge, the inventors have completed the invention.

According to a first aspect of the invention, there is provided a discharge lamp including a light emitting tube having a discharge space therein, and a pair of electrodes disposed in the discharge space so as to be opposed to each other, wherein a changing rate of a cross-sectional area is equal to or lower than 200%, the changing rate being a rate of change of the cross-sectional area in every 0.25 mm in a direction along an optical axis of the light emitting tube, the cross-sectional area is an area of a plane perpendicular to the optical axis in a space between an outside shape of at least one of the pair of electrodes and an inside wall of the light emitting tube.

According to the discharge lamp related to the first aspect of the invention, there is provided a configuration in which the cross-sectional area in the space between the electrode and the discharge tube does not rapidly change in the optical axis direction. Thus, the pressure loss and the separated circulating flow are prevented from occurring in the space between the rear end part of the electrode and the light emitting tube. Therefore, since the speed of the convection flow is suppressed in the rear end part of the electrode, it is possible to make it difficult for the metal projection to be formed on the base part of the electrode. Therefore, the blackening and the devitrification are prevented from occurring, and a longer life of the discharge lamp can be achieved.

In the discharge lamp described above, it is preferable that the changing rate of the cross-sectional area of the plane in a space between an outside shape of one the pair of electrodes and the inside wall and the changing rate of the cross-sectional area of the plane in a space between an outside shape of the other electrode and the inside wall are equal to or lower than 200%.

According to this configuration, by suppressing the convection speed in the rear end parts of the both electrodes, it is possible to make it difficult for the metal projection to be formed on the base parts of the electrodes.

In the discharge lamp described above, it is preferable that the cross-sectional area in the space is a cross-sectional area in a space between an outside shape of a rear end side of one of the electrodes and the inside wall, and the rear end side is an opposite side to a distal end side of the one electrode which is opposed to the other electrode.

According to this configuration, as described above, it is possible to increase the space between the rear end part of the electrode and the light emitting tube.

According to a second aspect of the invention, there is provided a light source device including the discharge lamp according to the first aspect of the invention, and a discharge lamp lighting device configured to supply the discharge lamp with a drive current to light the discharge lamp.

According the light source device related to the second aspect of the invention, since the discharge tube described above is provided, bright light can be obtained for a long period of time.

According to a third aspect of the invention, there is provided a projector including the light source device according to the second aspect of the invention, a light modulation device configured to modulate light emitted from the light source device in accordance with image information, and a projection optical system configured to project the light modulated by the light modulation device.

According the projector related to the third aspect of the invention, since the light source device described above is provided, bright image light can be projected for a long period of time.

In the projector described above, it is preferable that an exterior housing constituting an exterior is further included, the exterior housing includes a bottom plate part opposed to an installation surface, and a top plate part disposed at an upper side of the bottom plate part in the vertical direction, and the cross-sectional area in the space is a cross-sectional area in a space located at the top plate part side with respect to a plane parallel to the installation surface and passing through the optical axis of the light emitting tube.

According to this configuration, it is possible to increase the space located at the upper side in the vertical direction and between the rear end part of the electrode and the light emitting tube. Therefore, the speed of the convection flow from the top plate side toward the base part of the electrode can be suppressed.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An embodiment of the invention will hereinafter be described in detail with reference to the accompanying drawings.

It should be noted that the drawings used in the following description show characteristic parts in an enlarged manner in some cases in order to make the characteristics easy to understand, and the dimensional ratios between the constituents and so on are not necessarily the same as actual ones.

In the present embodiment, a so-called three-panel liquid crystal projector using three sets of transmissive liquid crystal light valves as the light modulation element will be described as an example.

Figure 1:
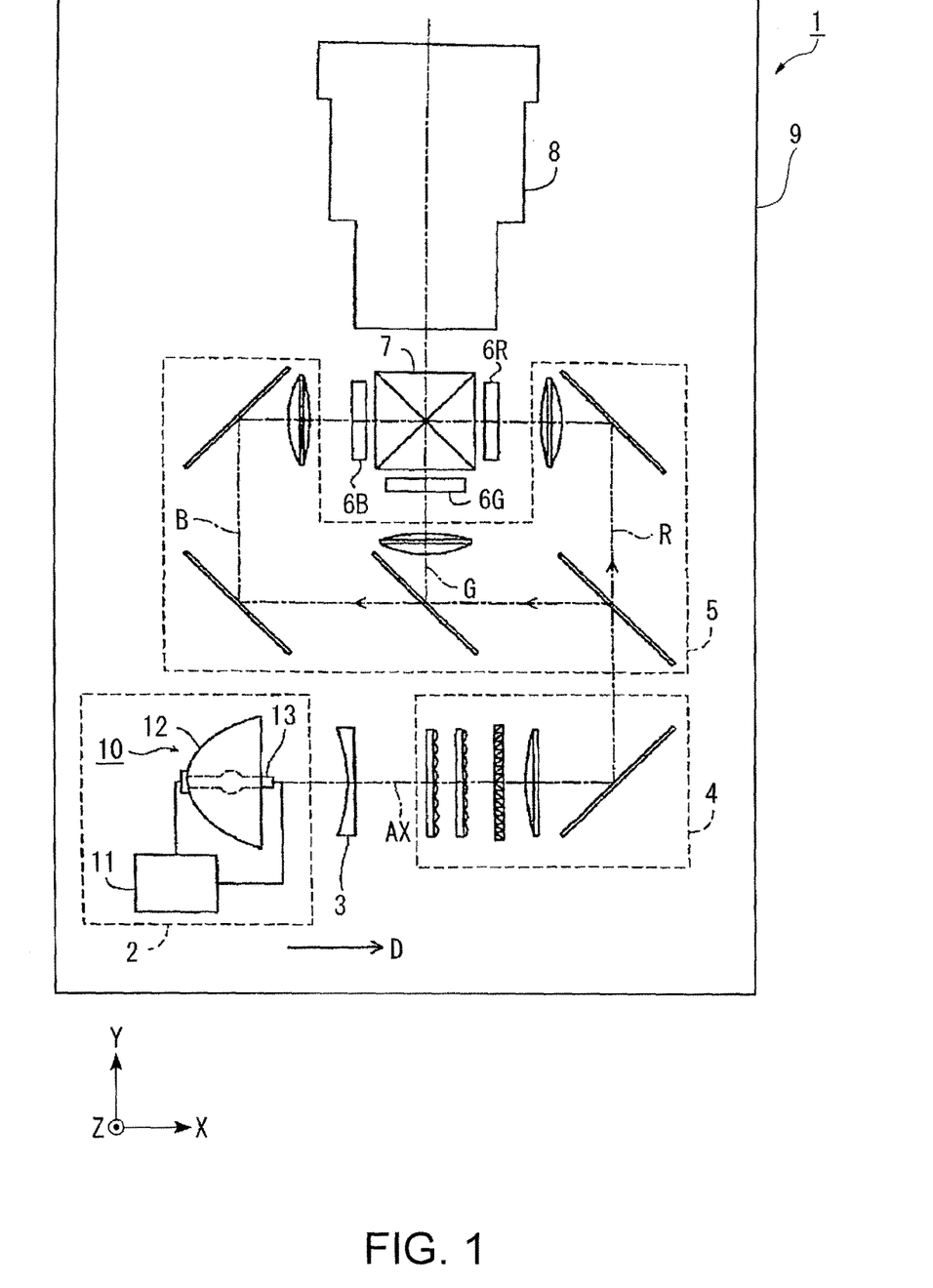
FIG. 1 is a schematic configuration diagram of a projector.

FIG. 1 is a schematic configuration diagram of the projector according to the present embodiment.

As shown in FIG. 1, the projector 1 according to the present embodiment is provided with a light source device 2, a collimating lens 3, an illumination optical system 4, a color separation optical system 5, a liquid crystal light valve 6R, a liquid crystal light valve 6G, a liquid crystal light valve 6B, a cross dichroic prism 7, a projection optical system 8, and an exterior housing 9.

The liquid crystal light valve 6R, the liquid crystal light valve 6G, and the liquid crystal light valve 6B of the present embodiment correspond to a light modulation device of the appended claims.

Further, in FIG. 1, an XYZ coordinate system is shown as a three-dimensional rectangular coordinate system. In the XYZ coordinate system, an X-axis direction is a direction parallel to the direction in which light is emitted from the light source device 2, namely a horizontal direction in FIG. 1. A Z-axis direction is a direction perpendicular to the X-axis direction, and parallel to a plane including the light emission direction and a vertical direction. A Y-axis direction is a direction perpendicular to the X-axis direction and the Z-axis direction.

The light emitted from the light source device 2 passes through the collimating lens 3, and enters the illumination optical system 4. The collimating lens 3 collimates the light emitted from the light source device 2.

The illumination optical system 4 adjusts the illuminance of the light emitted from the light source device 2 so as to be homogenized on the liquid crystal light valve 6R, the liquid crystal light valve 6G, and the liquid crystal light valve 6B. The illumination optical system 4 uniforms the polarization direction of the light emitted from the light source device 2 to one direction. The reason therefor is to effectively utilize the light emitted from the light source device 2 in the liquid crystal light valve 6R, the liquid crystal light valve 6G, and the liquid crystal light valve 6B.

The light emitted from the illumination optical system 4 enters the color separation optical system 5. The color separation optical system 5 separates the incident light into three colored light beams, namely a red light beam (R), a green light beam (G), and a blue light beam (B). The liquid crystal light valve 6R, the liquid crystal light valve 6G, and the liquid crystal light valve 6B associated with the respective colored light beams modulate the three colored light beams, respectively, in accordance with a video signal. The liquid crystal light valve 6R, the liquid crystal light valve 6G, and the liquid crystal light valve 6B are each provided with a liquid crystal panel and polarization plates. The polarization plates are disposed respectively at the light entrance side and the light exit side of the liquid crystal panel.

The three colored light beams respectively modulated by the liquid crystal light valve 6R, the liquid crystal light valve 6G, and the liquid crystal light valve 6B are combined with each other by the cross dichroic prism 7. The composite light enters the projection optical system 8. The projection optical system 8 projects the incident light on a screen (not shown). Thus, a picture is displayed on the screen. A known configuration can be adopted as a configuration of each of the collimating lens 3, the illumination optical system 4, the color separation optical system 5, the cross dichroic prism 7, and the projection optical system 8.

Figure 2:
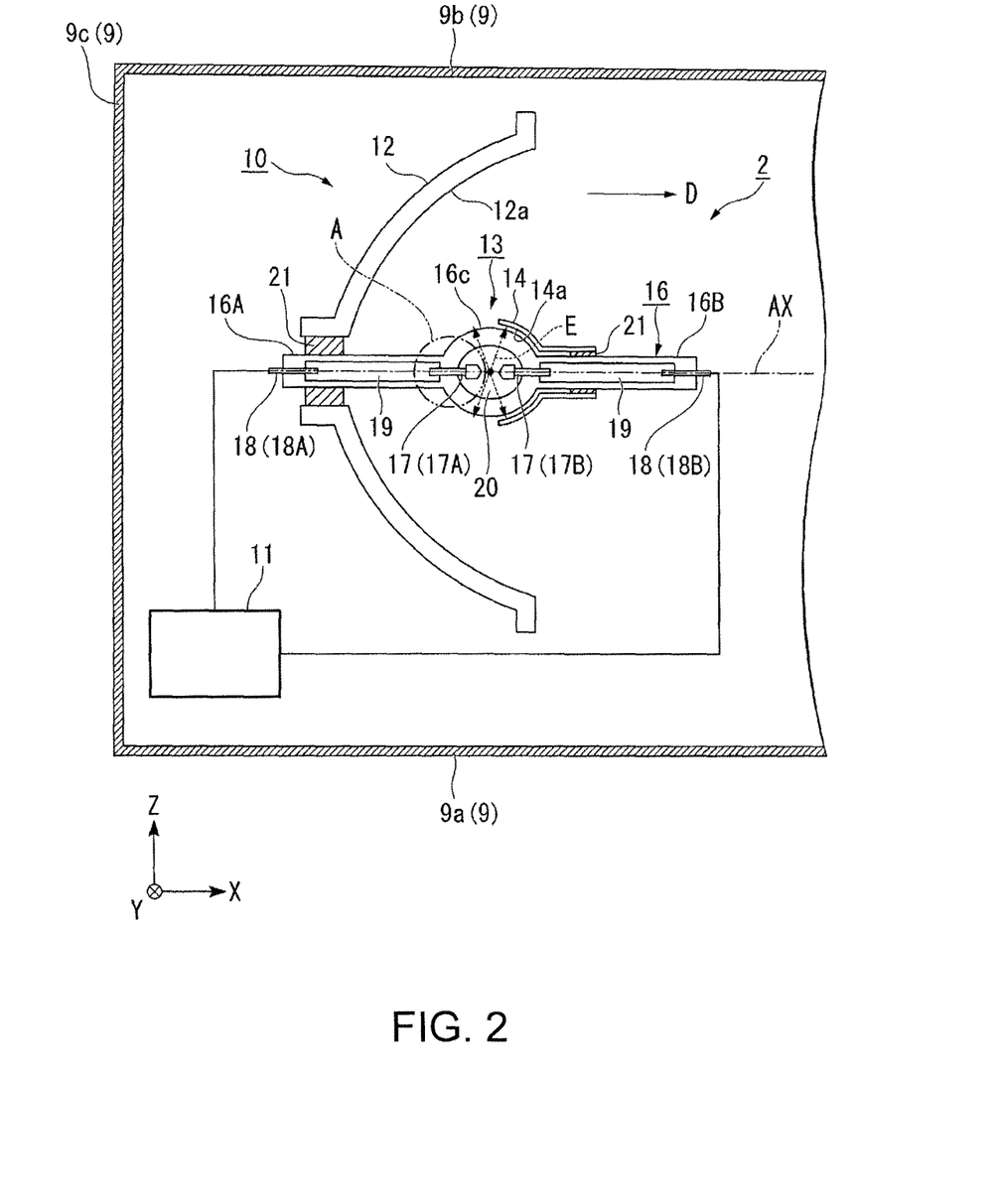
FIG. 2 is a cross-sectional view showing a configuration of a light source device.

FIG. 2 is a cross-sectional view showing a configuration of the light source device 2. FIG. 2 shows a cross-sectional view of a light source unit 10. In FIG. 2, the XYZ coordinate system is also shown as the three-dimensional rectangular coordinate system.

In the present embodiment, the Z-axis direction is parallel to, for example, a vertical direction. Therefore, in the following description, the positive side (+Z side) of the Z-axis direction is defined as an upper side in the vertical direction, and a negative side (−Z side) of the Z-axis direction is defined as a lower side in the vertical direction. The same applies to FIGS. 3, 5, and 6 described later.

As shown in FIG. 2, the light source device 2 is provided with the light source unit 10 and a discharge lamp lighting device 11. The light source unit 10 is provided with a main reflecting mirror 12, a discharge lamp 13, and a sub-reflecting mirror 14.

The discharge lamp 13 is housed in the exterior housing 9 constituting an exterior of the projector 1. The exterior housing 9 includes a bottom plate part 9a opposed to an installation surface M on which the projector 1 is installed, a top plate part 9b disposed at the opposite side to the bottom plate part 9a, namely the upper side in the vertical direction with respect to the bottom plate part 9a, and a lateral plate part 9c connecting the bottom plate part 9a and the top plate part 9b to each other.

The discharge lamp lighting device 11 supplies the discharge lamp 13 with a drive current to thereby light the discharge lamp 13.

The main reflecting mirror 12 reflects the light, which has been emitted from the discharge lamp 13, in an irradiation direction D. The irradiation direction D is a direction, which is parallel to the optical axis AX of the discharge lamp 13, and in which the main reflecting mirror 12 opens. The optical axis AX of the discharge lamp 13 has a direction in which an end part of the light emitting tube described later extends.

The discharge lamp 13 is provided with the light emitting tube 16, a pair of electrodes 17, a pair of terminals 18, and electrically-conductive members 19. The light emitting tube 16 has a rod-like shape extending roughly along the irradiation direction D. In the following description, out of the both end parts of the light emitting tube 16, the end part fixed to the main reflecting mirror 12 is referred to as a first end part 16A, and the end part located at the opposite side to the first end part 16A is referred to as a second end part 16B. The light emitting tube 16 is formed of a light transmissive material such as quartz glass. Between the first end part 16A and the second end part 16B of the light emitting tube 16, there is disposed a bulging part 16C bulging to have a spherical shape. The inside of the bulging part 160 is a space for generating discharge between the pair of electrodes 17, namely a so-called discharge space 20. In the discharge space 20, there is encapsulated a gas as a discharge medium including a noble gas, a metallic halide, and so on.

The pair of electrodes 17 are disposed inside the light emitting tube 16 so as to be opposed to each other. In the following description, out of the pair of electrodes 17, the electrode located closer to the first end part 16A of the light emitting tube 16 is referred to as a first electrode 17A, and the electrode located closer to the second end part 16B of the light emitting tube 16 is referred to as a second electrode 17B. Posterior ends of the first electrode 17A and the second electrode 17B are respectively embedded in the first end part 16A and the second end part 16B of the light emitting tube 16. Anterior ends of the first electrode 17A and the second electrode 17B are located in the discharge space 20. The first electrode 17A and the second electrode 17B each have a rod-like shape extending along the optical axis AX, and the diameter at the anterior end side is made larger than the diameter at the posterior end side. In the discharge space 20, the anterior ends of the first electrode 17A and the second electrode 17B are opposed to each other with a predetermined distance. The material of the first electrode 17A and the second electrode 17B is metal such as tungsten.

The first terminal 18A is provided to the first end part 16A of the light emitting tube 16. The first terminal 18A and the first electrode 17A are electrically connected to each other via the electrically-conductive member 19 penetrating the inside of the light emitting tube 16. Similarly, the second terminal 18B is provided to the second end part 16B of the light emitting tube 16. The second terminal 18B and the second electrode 17B are electrically connected to each other via the electrically-conductive member 19 penetrating the inside of the light emitting tube 16. The material of the first terminal 18A and the second terminal 18B is metal such as tungsten. As the electrically-conductive member 19, a molybdenum foil is used, for example.

The first terminal 18A and the second terminal 18B are connected to the discharge lamp lighting device 11. The discharge lamp lighting device 11 supplies the first terminal 18A and the second terminal 18B with the drive current for driving the discharge lamp 13. As a result, arc discharge is generated between the first electrode 17A and the second electrode 17B. The light generated by the arc discharge is radiated from the discharge position in all directions as indicated by the dashed arrows E.

The main reflecting mirror 12 is fixed to the first end part 16A of the light emitting tube 16 with a fixation member 21. The main reflecting mirror 12 reflects the light, which has been generated in the bulging part 16C, toward the irradiation direction D. The shape of a reflecting surface 12a (a surface at the side on which the discharge lamp 13 is disposed) of the main reflecting mirror 12 is not particularly limited providing the light can be reflected toward the irradiation direction D. The shape of the reflecting surface 12a of the main reflecting mirror 12 can be, for example, a spheroidal shape, or a paraboloidal shape. In the case of, for example, adopting the paraboloidal shape as the shape of the reflecting surface 12a of the main reflecting mirror 12, the main reflecting mirror 12 is capable of converting the emitted light from the light source unit 10 into the light roughly parallel to the optical axis AX. Thus, the collimating lens 3 can be eliminated.

The sub-reflecting mirror 14 is fixed to the second end part 16B of the light emitting tube 16 with the fixation member 21. The shape of a reflecting surface 14a of the sub-reflecting mirror 14 is a semispherical shape covering roughly a half of the bulging part 16C. The sub-reflecting mirror 14 reflects a part of the light, which has been generated in the bulging part 16C, toward the main reflecting mirror 12. Thus, the use efficiency of the light radiated from the discharge space 20 can be improved.

The material of the fixation members 21 is not particularly limited providing the material is a heat-resistant material which can withstand the heat generated by the discharge lamp 13. The material of the fixation members 21 is, for example, an inorganic adhesive. The method of fixing the main reflecting mirror 12 and the discharge lamp 13 to each other, or the sub-reflecting mirror 14 and the discharge lamp 13 to each other is not limited to the method described above, but an arbitrary method can be adopted. For example, it is also possible to fix the discharge lamp 13 and the main reflecting mirror 12 independently to a housing (not shown) of the projector 1. The same can be applied to the sub-reflecting mirror 14.

Figure 3:
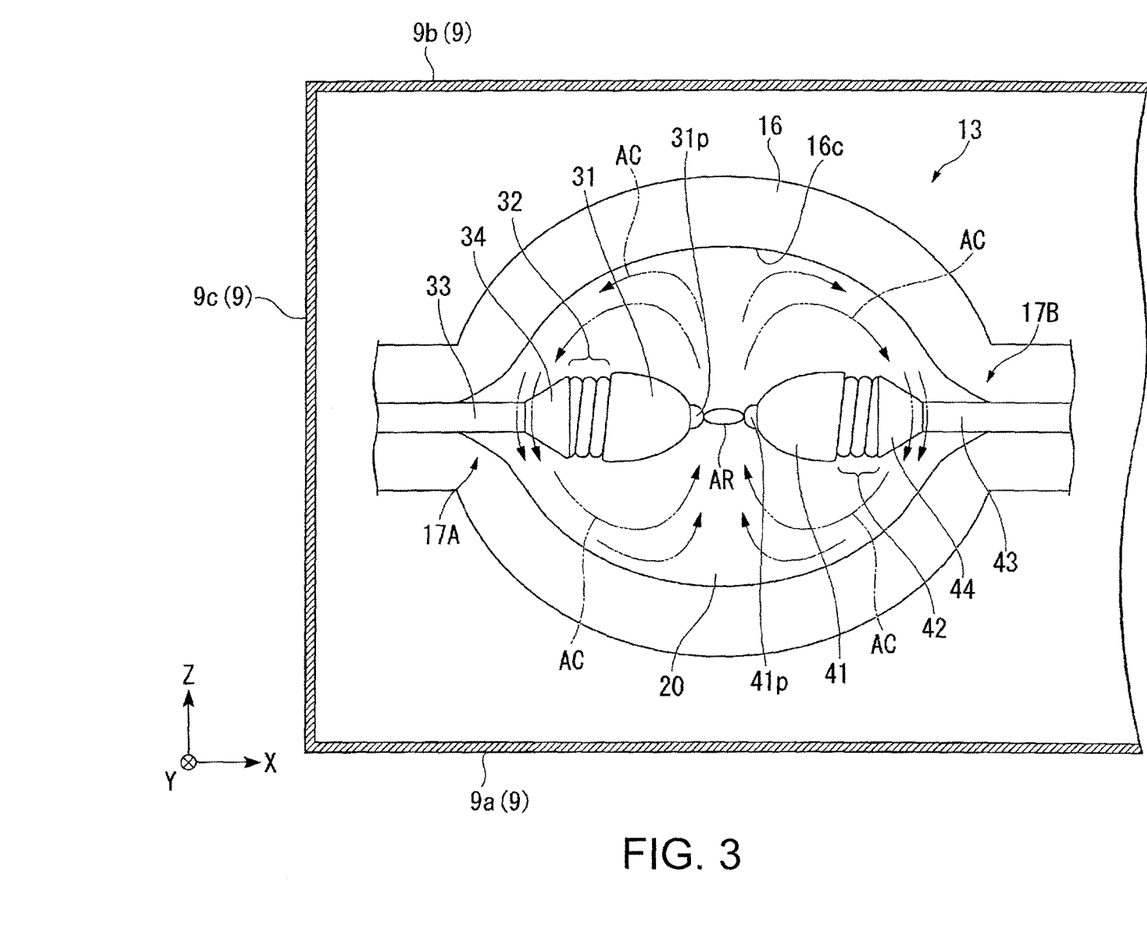
FIG. 3 is an enlarged cross-sectional view showing an essential part of a discharge lamp.

FIG. 3 is an enlarged cross-sectional view showing an essential part of the discharge lamp 13. It should be noted that since the first electrode 17A and the second electrode 17B have substantially the same configurations, only the first electrode 17A will be described as a representative in the following description. Further, since a projection 31p of the anterior end of the first electrode 17A and a projection 41p of the anterior end of the second electrode 17B have substantially the same configurations, only the projection 31p will be described as a representative in the following description.

As shown in FIG. 3, the first electrode 17A has a core member 33, a coil part 32, a tip part 31, the projection 31p, and a back-end part 34.

The core member 33 is a rod-like member formed of metal such as tungsten, and having a cylindrical shape extending in one direction. The coil part 32 has a configuration in which a conductive wire (metal wire) 27 made of tungsten is wound around the core member 33. The coil part 32 acts as a starting point of the discharge when lighting the discharge lamp 13, and further, emits the heat generated by the pair of electrodes 17 after lighting the discharge lamp 13. The tip part 31 is disposed at the tip of the core member 33 at the side opposed to the second electrode 17B. The tip part 31 is formed of a conductive material such as tungsten. It should be noted that the tip part 31 is formed in a manufacturing process described later, and is therefore integrated with the coil part 32. The tip of the tip part 31 acts as a starting point of the arc discharge AR when lighting, and is provided with the projection 31p having a rounded shape.

The back-end part 34 is disposed at the opposite side to the tip part 31 with respect to the coil part 32. The back-end part 34 is formed of a conductive material such as tungsten. It should be noted that the back-end part 34 is formed in a manufacturing process described later, and is therefore integrated with the coil part 32.

Here, an example of the manufacturing process of the discharge lamp 13 will be explained.

The manufacturing process of the discharge lamp 13 according to the present embodiment is provided with a process of manufacturing the pair of electrodes 17 and a process of encapsulating the pair of electrodes 17 inside the light emitting tube 16.

For example, the process of manufacturing the first electrode 17A is provided with a process of forming the coil part 32 by winding the conductive wire 27 around the core member 33, a process of forming the tip part 31 by melting to integrate a distal end side of the core member 33 around which the conductive wire 27 is wound, and a process of forming the back-end part 34 by melting to integrate adjacent portions of the conductive wire 27 at a rear end side of the core member 33. It should be noted that the second electrode 17B is also manufactured using a similar process.

Further, a process of encapsulating the pair of electrodes 17 inside the light emitting tube 16 can be achieved using a known method, and therefore, the explanation thereof will be omitted.

The manufacturing process of the first electrode 17A out of the manufacturing process of the discharge lamp 13 will hereinafter be described. FIGS. 4A through 4D are diagrams showing the manufacturing process of the first electrode 17A. It should be noted that in FIGS. 4A through 4D, the right side of the core member 33 is assumed as the distal side (the distal end side opposed to the second electrode 17B when forming the discharge lamp 13), and the left side of the core member 33 is assumed as the rear end side.

Figure 4A:
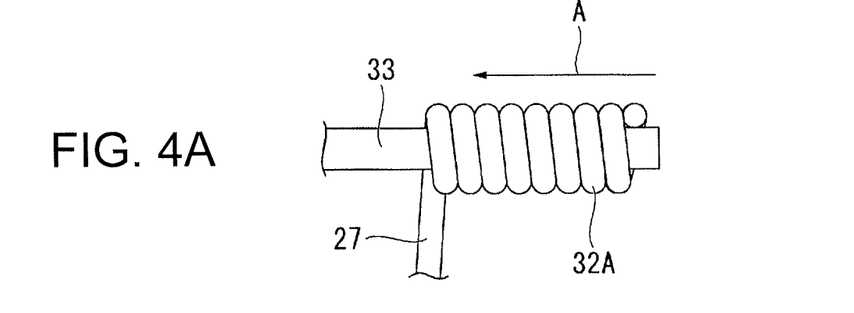
FIGS. 4A through 4D are diagrams showing a manufacturing process of a first electrode.

Firstly, as shown in FIG. 4A, the conductive wire 27 made of tungsten is wound around the core member 33 made of tungsten. In the present embodiment, as indicated by the arrow A, the conductive wire 27 is gradually wound from the distal end side of the core member 33 toward the rear end side. In other words, in the formation of the coil part 32, winding of the conductive wire 27 starts from the distal end side of the core member 33 opposed to the second electrode 17B toward the rear end side.

Thus, a first coil part 32A having a predetermined length is formed on the core member 33. On this occasion, it is preferable to densely wind the conductive wire 27 so that at least the adjacent parts of the conductive wire 27 have contact with each other. It should be noted that the first coil part 32A is a first layer of the conductive wire 27 wound around the core member 33.

Figure 4B:
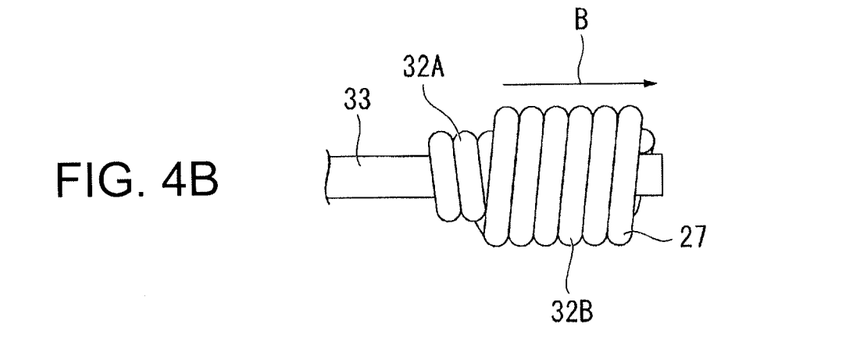

Then, as shown in FIG. 4B, the direction of winding the conductive wire 27 is flipped, and the conductive wire 27 continues to be wound from the rear end side of the core member 33 toward the distal end side as indicated by the arrow B. In other words, the conductive wire 27 having been wound from the distal end side of the core member 33 toward the rear end side is then folded toward the distal end side in the middle of the core member 33. In the present embodiment, the conductive wire 27 is gradually wound from the middle of the first coil part 32A to form a second layer so as to form a place, in which the first coil part 32A is exposed, at the rear end side of the core member 33, but is not wound so as to overlap the first coil part 32A immediately after being folded. Thus, a second coil part 32B having a predetermined length is formed on the first coil part 32A. It should be noted that the second coil part 32B is the second layer of the conductive wire 27 wound around the first coil part 32A. Here, in the present embodiment, the clause that the coil part is exposed means the fact that at least a part of the surface of the coil part, which forms the lower layer, and which the conductive wire 27 overlaps, is exposed in the direction perpendicular to the extending direction in which the core member 33 extends, namely, the fact that a part, which does not overlap the coil part forming the upper layer, remains in the coil part forming the lower layer.

Due to the process described hereinabove, there is formed the coil part 32 having a step in which the part at the rear end side of the first coil part 32A is exposed from the second coil part 32B. Although in the present embodiment, the coil part 32 is formed by doubly winding the conductive wire 27, it is also possible to form the coil part 32 by winding the conductive wire 27 threefold or more.

Further, in the present embodiment, the coil parts 32, 42 each formed of the conductive wire 27 forming the two layers are each formed with the single conductive wire 27 by winding the conductive wire 27 around the core member 33 and then folding the conductive wire 27 in the middle of the core member 33, and then continuously winding the conductive wire 27. However, the way of winding the conductive wire 27 around the core member 33 is not limited thereto. For example, it is also possible to form the coil parts 32, 42 each formed of two conductive wires 27 by cutting the conductive wire 27 every time the conductive wire 27 is wound in one direction.

Figure 4C:
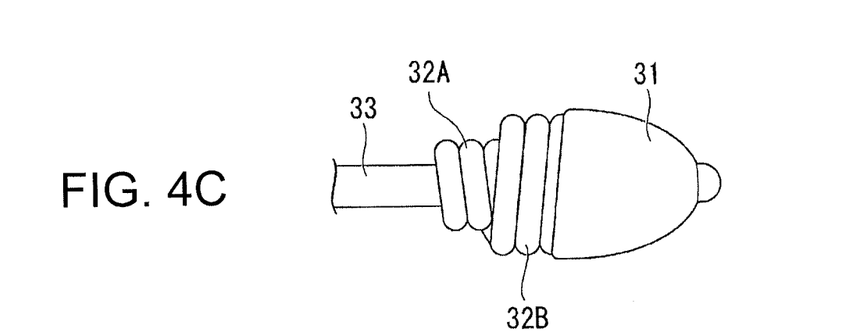

Then, as shown in FIG. 4C, the distal end side of the coil part 32 is heated using a method such as irradiation with a laser beam to thereby melt to integrate the adjacent parts of the conductive wire 27 with each other. Thus, the tip part 31 is formed on the tip of the core member 33. On this occasion, it is preferable to sufficiently heat the coil part 32 so that not only the parts of the conductive wire 27 adjacent to each other in the extending direction of the core member 33, but also parts of the conductive wire 27 adjacent to each other in the depth direction perpendicular to the extending direction of the core member 33 in the coil part 32, namely the conductive wire 27 in the first coil part 32A and the conductive wire 27 in the second coil part 32B, are integrated with each other.

In the case in which the distal end side of the coil part 32 is completely melted, since the conductive wire 27 is not exposed on the surface in the tip part 31 of the core member 33, unwanted discharge between the light emitting tube 16 and the electrode 17 can effectively be suppressed.

Figure 4D:
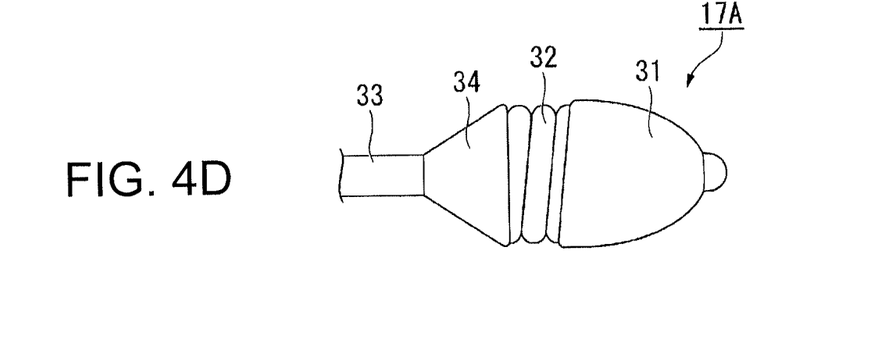

Then, as shown in FIG. 4D, a part at the rear end side of the coil part 32 is heated using a method such as irradiation with a laser beam to thereby melt to integrate the adjacent parts of the conductive wire 27 with each other. The part at the rear end side of the coil part 32 mentioned here is a part in which the coil part 32 has a step between the back-end of the first coil part 32A and the back-end of the second coil part 32B as shown in FIG. 4C. On this occasion, it is also possible to completely melt the coil part 32 so that all of the parts of the conductive wire 27 adjacent with each other in the depth direction of the coil part 32 are integrated with each other, or it is also possible to adopt a configuration in which the coil part 32 remains but is not completely melted in the depth direction of the coil part 32. Due to the process described hereinabove, the first electrode 17A is completed.

In the present embodiment, the tip part 31 is formed by melting the end part of the coil part 32 located at the side, at which winding of the conductive wire 27 around the core member 33 is started, and on which the winding is finally terminated and then the conductive wire 27 is cut after the winding of the conductive wire 27 is folded in the middle of the core member 33. Thus, since the starting end and the terminating end of the winding of the conductive wire 27 around the core member 33 are melted for forming the tip part 31 while preventing the projected part to be a starting point of discharge from being formed at the rear end side of the coil part 32, it is possible to prevent the end part to be a starting point of generation of unwanted discharge from being formed in the whole of the first electrode 17A to thereby improve the life of the light emitting tube 16.

The second electrode 17B has a core member 43, the coil part 42, a tip part 41, a projection 41p, and a back-end part 44. The second electrode 17B is formed in substantially the same manner as in the case of the first electrode 17A.

Then, by encapsulating the pair of electrodes 17 (the first electrode 17A and the second electrode 17B) inside the light emitting tube 16, the discharge lamp 13 according to the present embodiment is completed.

Here, going back to FIG. 3, when lighting the discharge lamp 13, the gas encapsulated in the discharge space 20 is heated due to the generation of the arc discharge AR, and convects inside the discharge space 20. In detail, since the arc discharge AR and an area in the vicinity of the arc discharge AR become extremely high in temperature, there occur convection flows AC (indicated by the dashed-dotted arrows) flowing roughly vertically upward (toward the +Z side) from the arc discharge AR in the discharge space 20. The convection flows AC collide with the inside wall 16c of the light emitting tube 16 to move along the inside wall 16c of the light emitting tube 16, and then fall while being cooled in the process of passing through the core members 33, 43 of the first electrode 17A and the second electrode 17B and so on.

The convection flows AC thus having fallen further fall along the inside wall 16c of the light emitting tube 16, and then collide with each other at the lower side in the vertical direction of the arc discharge AR, and then rise so as to return to the arc discharge AR located above.

Incidentally, due to the convection flows AC caused by the arc discharge AR, the vaporized metal constituting the first electrode 17A and the second electrode 17B circulates in the discharge space 20 of the discharge lamp 13.

In the present embodiment, the metal constituting the first electrode 17A and the second electrode 17B is tungsten as described above. Therefore, when the convection flows AC collide with the first electrode 17A and the second electrode 17B, there is a possibility that the metal circulating due to the convection flows AC is deposited on the first electrode 17A and the second electrode 17B.

Specifically, the convection flows AC are apt to collide with a base part of the first electrode 17A, namely the end part of the coil part 32 located at the opposite side to the arc discharge AR. Therefore, there is a possibility that the metal is locally deposited on the coil part 32 to form a metal projection. Similarly, there is a possibility that the metal projection is also formed on the coil part 42 of the second electrode 17B.

If the metal projection is formed on the coil part 32 or the coil part 42, discharge occurs between the metal projection and the inside wall 16c of the light emitting tube 16 in some cases. Thus, there is a possibility that a brown ring, for example, occurs on the inside wall 16c of the light emitting tube 16 to deteriorate the inside wall 16c of the light emitting tube 16. The brown ring is a phenomenon that the glass of the inside wall 16c of the light emitting tube 16 is altered due to the discharge, and turns brown in a ring-like area.

The part where the brown ring occurs decreases in light transmittance, and is apt to rise in temperature. Thus, devitrification is apt to occur in the part where the brown ring occurs. Further, the metal circulating due to the convection flows AC is apt to adhere to the part where the brown ring occurs to cause blackening. Due to these reasons, there is a possibility that there occurs the problem that the illuminance of the discharge lamp 13 is lowered, and the life of the discharge lamp 13 is shortened.

The inventors have found out the fact that if the speed of the convection flows AC increases, the metal projection becomes easy to form. Further, the inventors have found out the fact that the speed of the convection flows AC described above depends on the size of the space between the base part of the electrode 17 and the inside wall 16c of the light emitting tube 16. Therefore the inventors have obtained the knowledge that by making the space described above as large as possible, it is possible to suppress the speed of the convection flows AC, and as a result, to prevent the metal projection from being formed. Further, based on this knowledge, the inventors have found out the configuration of the discharge lamp 13 according to the present embodiment.

Here, the space between the electrode 17 and the inside wall 16c of the light emitting tube 16 of the present embodiment will be described. It should be noted that although the explanation will hereinafter be presented using the space between the first electrode 17A and the inside wall 16c of the light emitting tube 16 as an example, substantially the same relationship is true for the space between the second electrode 17B and the inside wall 16c of the light emitting tube 16, the details of which will be omitted.

Figures 5A, 5B:
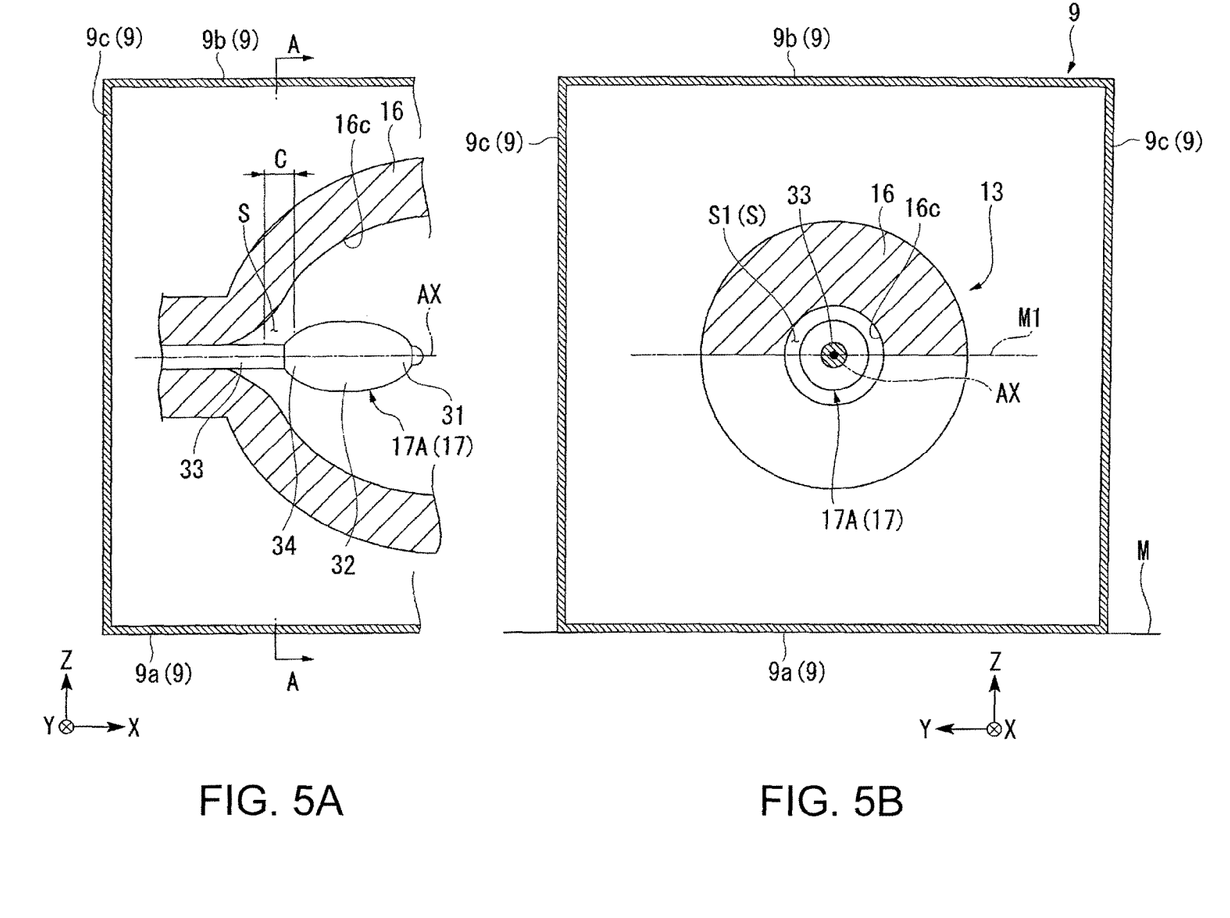
FIGS. 5A and 5B are diagrams showing a space between the electrode and an inside wall of a light emitting tube.

FIGS. 5A and 5B are conceptual diagrams showing the space between the electrode 17 and the inside wall 16c of the light emitting tube 16. Specifically, FIG. 5A is a cross-sectional view along a plane, which includes the optical axis AX of the discharge lamp 16 including the electrode 17 and the light emitting tube 16, and is parallel to the X-Z plane. FIG. 5B is a cross-sectional view along the arrowed line A-A shown in FIG. 5A. Further, in FIGS. 5A and 5B, the outer shape line of the electrode 17 is represented by a line connecting the outermost surfaces of the coil part 32 without taking the gaps of the conductive wire 27 of the coil part 32 into consideration.

As shown in FIG. 5A, the back-end part 34 of the first electrode 17A has a shape decreasing in the outside diameter in the plane perpendicular to the optical axis AX as the plane moves toward the base side (the −X side) of the first electrode 17A. Here, the outside diameter of the back-end part 34 gradually decreases toward the base side. It should be noted that the outside diameter of the coil part 32 is roughly uniform. Further, the inside wall 16c of the light emitting tube 16 has a shape decreasing in the inside diameter in the plane perpendicular to the optical axis AX as the plane moves toward the base side of the first electrode 17A.

Here, the light emitting tube 16 adopts a structure for encapsulating the first electrode 17A inside. Therefore, in the light emitting tube 16, a rate of change (changing rate) in inside diameter of the inside wall 16c corresponding to the rear end side of the first electrode 17A is higher than the rate of change in inside diameter of the inside wall 16c corresponding to the distal end side or the central portion of the first electrode 17A.

In other words, in the first electrode 17A, the rate of change in the optical axis AX direction (the X direction) of the cross-sectional area of the plane (the plane parallel to the Y-Z plane) perpendicular to the optical axis AX of the space between the outer shape of the rear end side and the inside wall 16c of the light emitting tube 16 becomes high.

If the rate of change in the cross-sectional area described above is high, a pressure loss or a separated circulating flow occurs in the discharge space 20, and the convection flows AC collide with the base part of the first electrode 17A to thereby make it easy to form the metal projection. As a result, there is a possibility that the brown ring, the devitrification, and the blackening described above occur to incur degradation of the illuminance of the discharge lamp 13.

In contrast, in the discharge lamp 13 according to the present embodiment, the rate of change (changing rate) of the cross-sectional area S1 is set to equal to or lower than 200%. The changing rate is a rate of change of the cross-sectional area S1 in every 0.25 mm in the direction along the optical axis AX. The cross-sectional area S1 is an area of a plane perpendicular to the optical axis AX in the space S between the outside shape of the first electrode 17A and the inside wall 16c of the light emitting tube 16. In the present embodiment, by adjusting, for example, the shape of the back-end part 34 of the first electrode 17A, the configuration of setting the rate of change to be equal to or lower than 200% is realized. It should be noted that the value 0.25 mm corresponds to the outside diameter of the conductive wire 27 constituting each of the coil parts 32, 42.

In the present embodiment, the space S described above is a space between the outside shape of the rear end side of the first electrode 17A and the inside wall 16c of the light emitting tube 16 as an area C indicated by the two arrows shown in FIG. 5A. The rear end side of the first electrode 17A is an opposite side to the distal end side of the first electrode 17A which is opposed to the second electrode 17B. Here, the outside shape of the rear end side of the first electrode 17A corresponds to the outside shape of a part including a part of the back-end part 34, a part of the core member 33, and a connection part between the back-end part 34 and the core member 33.

Further, as shown in FIG. 5B, the cross-sectional area S1 in the space S described above corresponds to the cross-sectional area in the space located at the top plate part 9b side with respect to a plane (a plane parallel to the X-Y plane) M1 passing through the optical axis AX of the light emitting tube 16 with the bottom plate part 9a parallel to the installation surface M, on which the projector 1 is installed. In other words, the cross-sectional area S1 corresponds to the cross-sectional area of an upper half in the vertical direction of the space between the first electrode 17A and the inside wall 16c of the light emitting tube 16.

According to the present embodiment, since the rate of change in every 0.25 mm in the direction along the optical axis AX of the cross-sectional area S1 of the space S is set to be equal to or lower than 200%, there is achieved a structure in which the cross-sectional area S1 of the space S between each of the back-end parts 34, 44 of the coil parts 32, 42 of the pair of electrodes 17 and the light emitting tube 16 does not rapidly change in the optical axis AX direction.

Table 1 described below shows a result of a simulation for evaluating the effectiveness of the invention. In Table 1, EXAMPLE 1 corresponds to the discharge lamp 13 according to the embodiment, and has the rate of change described above is set to be equal to or lower than 200%. In other words, the maximum value of the rate of change described above in EXAMPLE 1 is 200%. Further, in Table 1, EXAMPLE 2 corresponds to a simulation model in the case in which the outside shape of the rear end side of the electrode 17 is adjusted to thereby achieve the rate of change equal to or lower than 183%. In Table 1, the circles and the double-circles represent the fact that a better result was obtained in this order, and cross marks represent the fact that a bad result was obtained.

Figure 6:
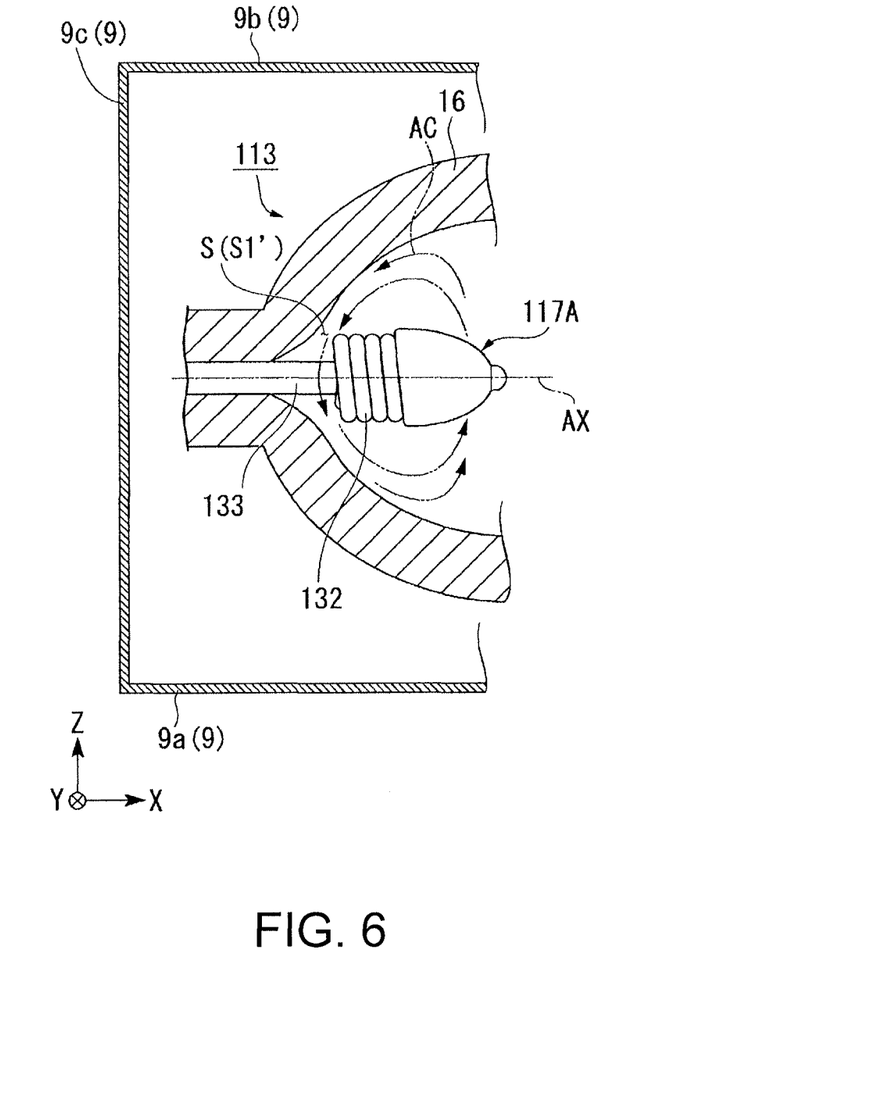
FIG. 6 is a cross-sectional view showing a configuration of a discharge lamp according to a comparative example.

FIG. 6 is a cross-sectional view showing a configuration of a discharge lamp 113 according to a comparative example. As shown in FIG. 6, a first electrode 117A of a discharge lamp 113 has a configuration in which an outside diameter in the plane perpendicular to the optical axis AX dramatically changes in a boundary part between a coil part 132 and a core member 133 at the rear end side. Specifically, the rate of change in every 0.25 mm in the direction along the optical axis AX of a cross-sectional area S1' of a space S' is higher than 200%. Specifically, in the discharge lamp 113 shown in FIG. 6, for example, the maximum value of the rate of change is 217%.

TABLE 1

| | CONVECTION SPEED | FORMATION OF METAL PROJECTION |
|---|---|---|
| EXAMPLE 1 | CIRCLE | CIRCLE |
| EXAMPLE 2 | DOUBLE-CIRCLE | DOUBLE-CIRCLE |
| COMPARATIVE EXAMPLE | CROSS | CROSS |

As shown in Table 1, according to EXAMPLE 1, namely the discharge lamp 13 according to the present embodiment, since the rate of change is set to be equal to or lower than 200% as described above, the speed of the convection flows AC can be suppressed compared to the configuration of the comparative example. Further, since the speed of the convection flows AC is suppressed, the metal projection can be prevented from being formed.

Further, according to the configuration of EXAMPLE 2, since the rate of change described above is set to 183%, the speed of the convection flows AC can further be suppressed. Further, since the speed of the convection flows AC is suppressed, the metal projection can be prevented from being formed.

As described above, according to the discharge lamp 13 related to the present embodiment, the pressure loss and the separated circulating flow in the space between each of the back-end parts 34, 44 of the pair of electrodes 17 and the light emitting tube 16 can be prevented from occurring. Thus, the speed of the convection flows AC is suppressed in the space between each of the back-end parts 34, 44 of the electrodes 17 and the light emitting tube 16, and as a result, it is possible to prevent the metal projection from being formed on the base parts of the electrodes 17.

Therefore, it is possible to prevent the inside wall 16c of the light emitting tube 16 from deteriorating due to the brown ring, the devitrification, and soon, and as a result, a longer life of the discharge lamp 13 can be achieved.

Further, according the light source device 2 related to the present embodiment, since the discharge lamp 13 described above is provided, bright light can be obtained for a long period of time. Further, according the projector 1 related to the present embodiment, since the light source device 2 described above is provided, bright image light can be projected for a long period of time.

It should be noted that the scope of the invention is not limited to the embodiment described above, but various modifications can be provided thereto within the scope or the spirit of the invention.

For example, although in the embodiment described above, the case in which the rate of change described above is set to be equal to or lower than 200% by adjusting the shape of the back-end parts 34, 44 of the electrodes 17 is cited as an example, it is also possible to arrange that the shape of the inside wall 16c of the light emitting tube 16 is adjusted. Alternatively, it is also possible to arrange that the shapes of the back-end parts 34, 44 and the inside wall 16c are adjusted respectively.

Further, although in the embodiment described above, there is described the case in which the rate of change of the cross-sectional area is equal to or lower than 200% in both of the pair of electrodes 17, the invention is not limited to this case. Specifically, it is sufficient that the rate of change described above is equal to or lower than 200% in either one of the first electrode 17A and the second electrode 17B.

Further, although in the embodiment described above, an example of the case in which the invention is applied to the transmissive projector is explained, the invention can also be applied to reflective projectors. Here, "transmissive" denotes that the liquid crystal light valve including the liquid crystal panel and so on is a type of transmitting the light. Further, "reflective" denotes that the liquid crystal light valve is a type of reflecting the light. It should be noted that the light modulation device is not limited to the liquid crystal panel or the like, but can also be a light modulation device using, for example, micro-mirrors.

Further, although in the embodiment described above, the example of the projector using three liquid crystal panels (the liquid crystal light valves 6R, 6G, and 6B) is cited, the invention can also be applied to a projector using a single liquid crystal panel alone, or a projector using four or more liquid crystal panels.

Besides the above, the shape, the number, the arrangement, the material, and so on of the variety of constituents of the projector are not limited to those of the embodiment described above, but can arbitrarily be modified.

The entire disclosure of Japanese Patent Application No. 2015-163475, filed Aug. 21, 2015 is expressly incorporated by reference herein.

What is claimed is:

1. A discharge lamp comprising:
a light emitting tube having a discharge space therein; and
a pair of electrodes disposed in the discharge space so as to be opposed to each other,
wherein a changing rate of a cross-sectional area is equal to or lower than 200%, the changing rate being a rate of change of the cross-sectional area in every 0.25 mm in a direction along an optical axis of the light emitting tube, the cross-sectional area being of a plane perpendicular to the optical axis in a space between an outside shape of at least one of the pair of electrodes and an inside wall of the light emitting tube.

2. The discharge lamp according to claim 1, wherein the changing rate of the cross-sectional area of the plane in a space between an outside shape of one of the pair of electrodes and the inside wall and the changing rate of the cross-sectional area of the plane in a space between an outside shape of the other electrode and the inside wall are equal to or lower than 200%.

3. The discharge lamp according to claim 1, wherein the cross-sectional area in the space is a cross-sectional area in a space between an outside shape of a rear end side of one of the electrodes and the inside wall, the rear end side being an opposite side to a distal end side of the one electrode which is opposed to the other electrode.

4. A light source device comprising:
the discharge lamp according to claim 1; and
a discharge lamp lighting device configured to supply the discharge lamp with a drive current to light the discharge lamp.

5. A light source device comprising:
the discharge lamp according to claim 2; and
a discharge lamp lighting device configured to supply the discharge lamp with a drive current to light the discharge lamp.

6. A light source device comprising:
the discharge lamp according to claim 3; and
a discharge lamp lighting device configured to supply the discharge lamp with a drive current to light the discharge lamp.

7. A projector comprising:
the light source device according to claim 4;
a light modulation device configured to modulate light emitted from the light source device in accordance with image information; and
a projection optical system configured to project the light modulated by the light modulation device.

8. A projector comprising:
the light source device according to claim 5;
a light modulation device configured to modulate light emitted from the light source device in accordance with image information; and
a projection optical system configured to project the light modulated by the light modulation device.

9. A projector comprising:
the light source device according to claim 6;
a light modulation device configured to modulate light emitted from the light source device in accordance with image information; and
a projection optical system configured to project the light modulated by the light modulation device.

10. The projector according to claim 5, further comprising:
an exterior housing constituting an exterior,
wherein the exterior housing includes a bottom plate part opposed to an installation surface, and a top plate part disposed at an upper side of the bottom plate part in the vertical direction, and
the cross-sectional area in the space is a cross-sectional area in a space located at the top plate part side with respect to a plane parallel to the installation surface and passing through the optical axis of the light emitting tube.

* * * * *